United States Patent [19]

Slaght

[11] 3,819,863

[45] June 25, 1974

[54] MEDICAL DATA TERMINAL FOR TRANSMITTING ANALOGUE AND DIGITAL DATA

[75] Inventor: William F. Slaght, St. Foy, Quebec, Canada

[73] Assignee: Her Majesty the Queen in right of Canada, as represented by the Minister of National Defence

[22] Filed: July 7, 1972

[21] Appl. No.: 269,553

[30] Foreign Application Priority Data

July 9, 1971 Canada ................................ 117825

[52] U.S. Cl. ......... 179/2 DP, 340/365 L, 128/2.1 A, 128/2.06 R

[51] Int. Cl. .......................................... H04m 11/06

[58] Field of Search ............. 179/2 DP, 2 R, 15 FD; 340/365, 149 A; 128/2.1 A, 2.06 R; 335/205, 335/206; 178/66 R, 17 R, 17 A, 17 C

[56] References Cited

UNITED STATES PATENTS

| | | | |
|---|---|---|---|
| 3,199,508 | 8/1965 | Roth | 179/2 R |
| 3,308,238 | 3/1967 | Brothman | 179/2 DP |
| 3,323,061 | 5/1967 | Davis | 178/66 R |
| 3,426,150 | 2/1969 | Tygart | 179/2 DP |
| 3,426,151 | 2/1969 | Tygart | 179/15 FD |
| 3,426,740 | 2/1969 | Hufton | 335/205 |
| 3,447,109 | 5/1969 | Shlesinger | 335/206 |
| 3,465,103 | 9/1969 | Lynch | 179/15 FD |
| 3,552,381 | 1/1971 | Burns | 128/2.1 A |
| 3,647,972 | 3/1972 | Glover | 179/2 DP |
| 3,660,789 | 5/1972 | Weisenburger | 335/206 |
| 3,718,764 | 2/1973 | Deschenes | 340/149 A |

OTHER PUBLICATIONS

Remote Ambulatory Real Time Monitoring Via Existing Public Telephone Circuits - Journal of Assoc. for Adv. of Medical Instrumentals, July–Aug. 1971

*Primary Examiner*—William C. Cooper
*Assistant Examiner*—Thomas D'Amico

[57] ABSTRACT

Transmission means adapted for the transmission of medical data over a telephone transmission link to a remote centre for diagnosis, comprises a signal generator, modulation means by which the output of the signal generator can be modulated to transmit binary alphanumeric information over the transmission link, modulation means by which the output of the signal generator can be modulated to transmit non-alphanumeric information as an analogue signal over the transmission link, and coupling means by which the modulated output of the signal generator can be applied to the telephone transmission link.

3 Claims, 18 Drawing Figures

MEDICAL DATA TERMINAL FOR TRANSMITTING ANALOGUE AND DIGITAL DATA

This invention relates to a data transmitting terminal, primarily designed and intended for the coding of information relating to a patient, and of an electrocardiogram relating to that patient, for transmission via a communication line or link to a remote computer.

Computers are used today for the high speed diagnosis of electrocardiograms, but on the other hand it is not practical to provide every hospital taking electrocardiograms with a computer programmed to diagnose such cardiograms. An objective of the present invention is the provision of a data transmitting terminal which can accept as input necessary data relating to the patient, and the data from the electrocardiograph machine, and feed this data into a suitable telephone line for transmission to a central computer which can receive and interpret this data and effect a diagnosis.

According to the present invention, transmission means adapted for the transmission of medical data over a telephone transmission link to a remote centre for diagnosis, comprises a signal generator, modulation means by which the output of the signal generator can be modulated to transmit binary alphanumeric information over the transmission link modulation means by which the output of the signal generator can be modulated to transmit nonalphanumeric information as an analogue signal over the transmission link, and coupling means by which the modulated output of the signal generator can be applied to the telephone transmission link.

The invention will now be described, by way of example, with reference to the accompanying drawings, in which.

Figure 9G:
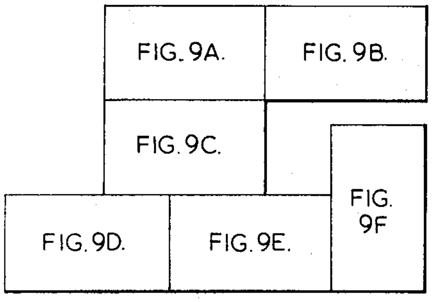
Figure 2:
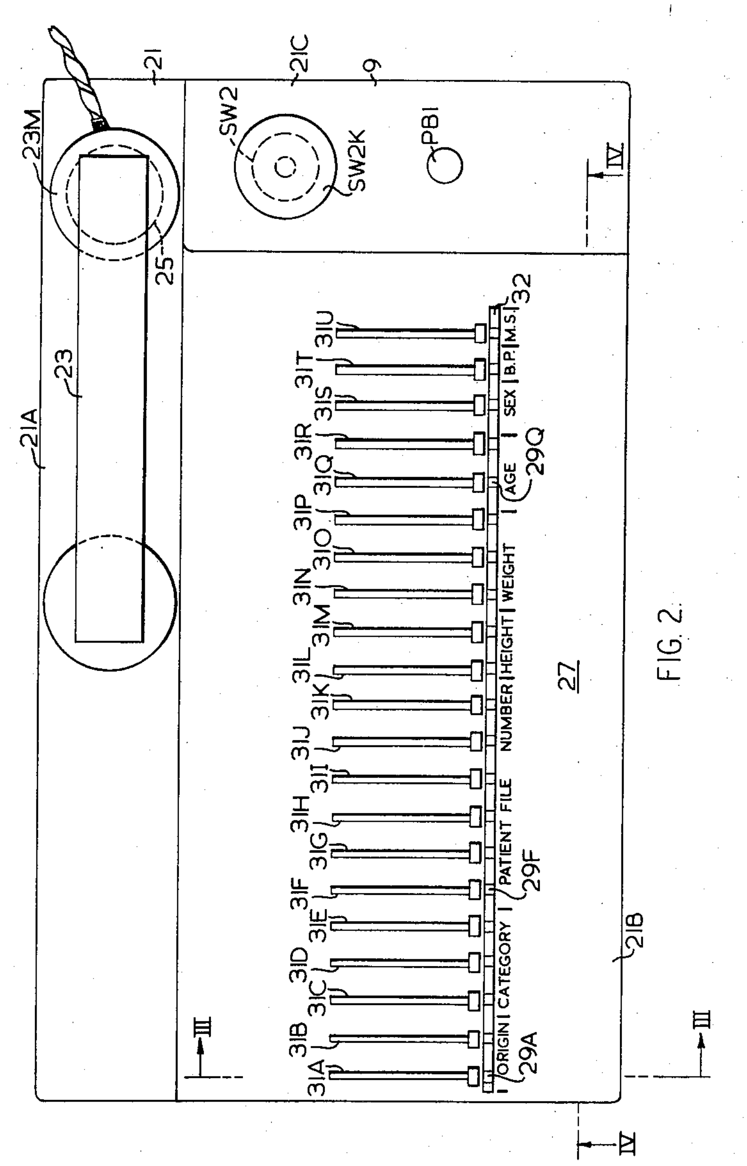
FIG. 2 is a plan view of a transmitter shown in FIG. 1.
Figure 10:
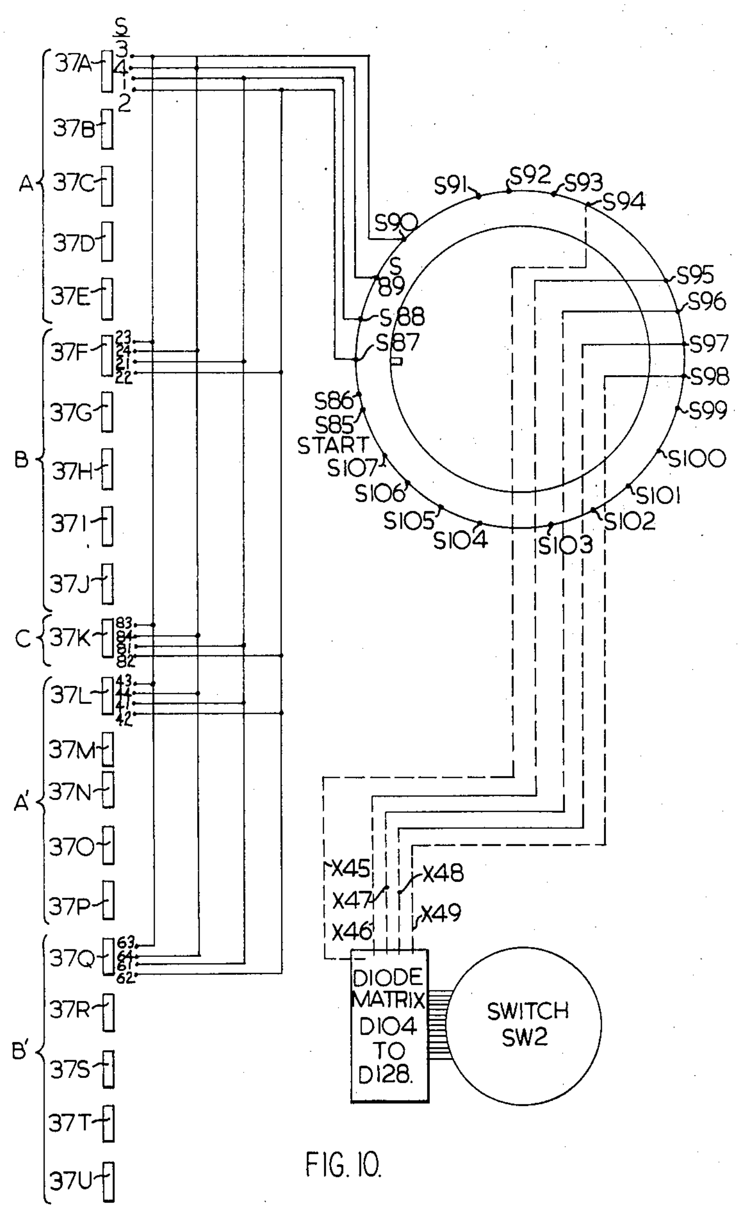

FIGS. 9A, 9B, 9C, 9D, 9E and 9F, when arranged as shown in FIG. 9G, show the circuit diagram of the transmitter of FIG. 2;

FIG. 10 is an explanatory diagram of the working of the circuit of FIG. 9G; and

Figure 11:
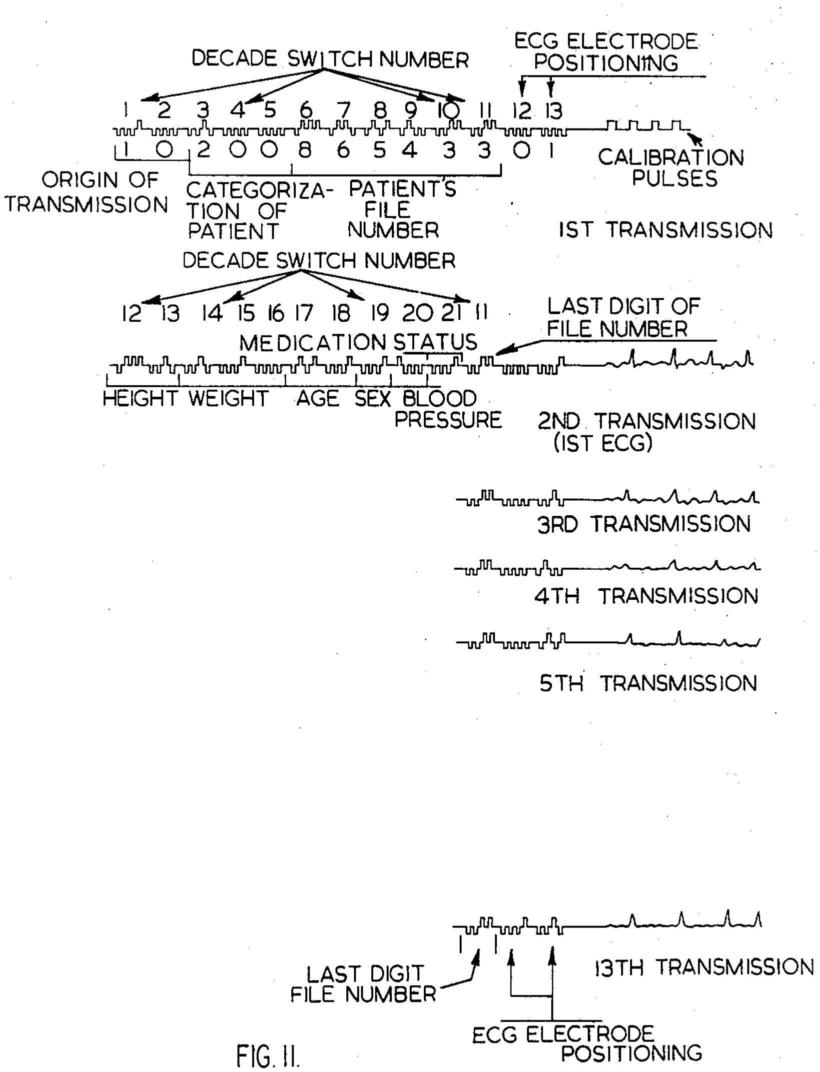

FIG. 11 is a diagrammatic representation of data transmitted by the transmitter of FIG. 2.

Figure 1:
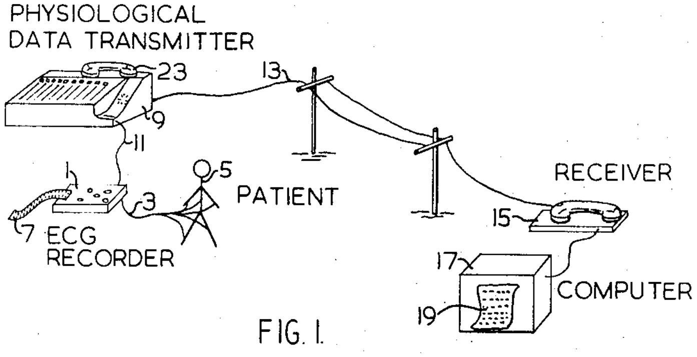
FIG. 1 is a diagrammatic representation of a complete system for the obtaining of an electrocardiogram of a patient, and its transmission to a central computer for diagnosis.

Referring first to FIG. 1, this depicts diagrammatically a system in which an electrocardiogram recorder 1 is connected by leads 3 to a patient 5, and would normally produce as a print-out an electrocardiogram 7. A physicological data transmitter 9, the subject matter of the present invention, is connected by a lead 11 to a recorder 1. The transmitter 9, when operating, is connected through a telephone communication link indicated diagrammatically at 13 by an overhead land line, is connected to an input terminal station 15 associated with a computer 17.

Many of the items shown in FIG. 1 are well known and will therefore be described only very briefly. Detailed descriptions are readily available in the art, and the equipment concerned can be obtained commercially without difficulty.

Thus the ECG recorder 1 is a standard piece of equipment in most hospitals, and the only novel feature is the provision of the lead 11 by which analogue signals, indicative of conditions being monitored in patient 5, are transmitted on to the transmitter 9 as well as being recorded. Lead 11 is connected to an amplifier output in the recorder and to socket S1 in FIG. 9E. The transmitter 11 is used with the handpiece of a telephone set through an acoustic coupler. It provides tone signals which are acoustically coupled to the telephone handpiece microphone, which passes on the signals received, over the transmission line 13 to terminal station 15 and then to the computer 17. Such terminal stations include an acoustic coupler, and most also permit the computer to feed information back into the telephone set microphone, also in the form of a tone signal, for transmission in the opposite direction to the transmitter 9. In the present instance, reverse communication to the transmitter 9 is not used.

Computer 17 is a digital computer provided with a program by which it can record as a print-out 19 certain basic data identifying a patient, and by which it can effect a diagnosis of the output in lead 11 from the ECG recorder, supplied to the computer as an audio analogue signal from the input terminal station 15, and print out its diagnosis on print out 19.

The novel part of the system shown in FIG. 1 is the physiological data transmitter 9, which is adapted and arranged to supply as analogue audio signals in line 13 certain manually entered data relating to the patient 5, and also the ECG signals from that patient.

The transmitter 9, as will be seen from FIGS. 1 and 2, is in the form of a moulded plastics housing 21, substantially rectangular in plan view, provided on a top rear section 21A with a cradle for a telephone handpiece 23, and an electromagnetic speaker 25 against which lies the telephone handpiece microphone 23M. The left-hand side 21B of the top front section slopes down towards the front of the transmitter, and includes a top plate 27 which is formed with 21 windows 29A through 29U and which above these windows is formed with 21 slots 31A through 31U aligned respectively with the centres of these windows. A magnifying lens 32 overlies all the windows 29A through 29U.

Figure 3:
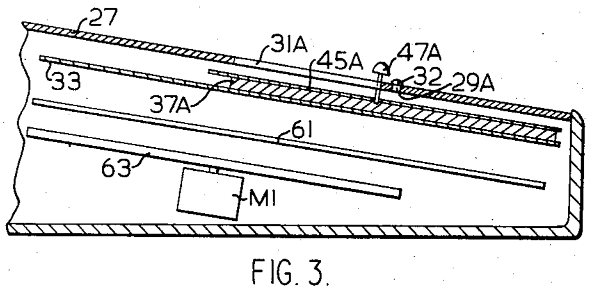
FIG. 3 is a sectional side elevation taken on the line III—III of FIG. 2 and as viewed in the direction indicated by the arrows.
Figure 4:
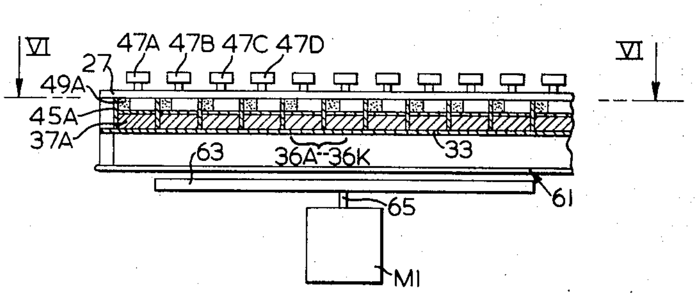
FIG. 4 is a sectional front elevation taken on the line IV—IV of FIG. 2 and as viewed in the direction indicated by the arrows.
Figure 5:
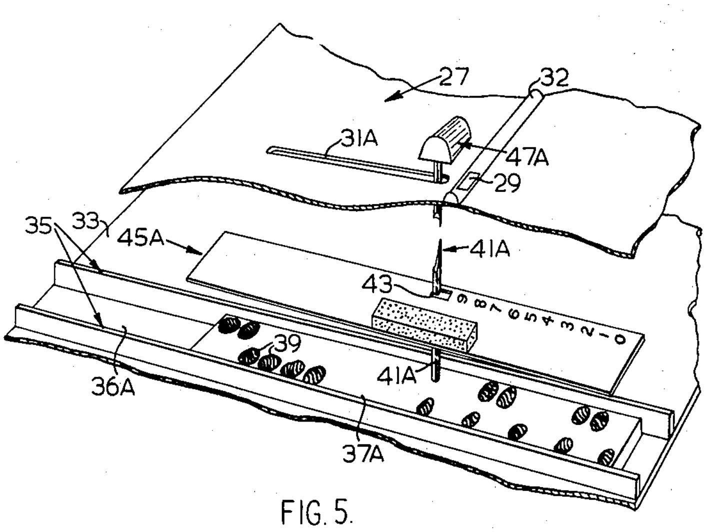
FIG. 5 is an exploded perspective drawing of part of the mechanism shown in FIGS. 3 and 4 and shows more clearly certain parts thereof.

Positioned below the panel 27 (see FIGS. 3 to 5) is a thin plate 33 formed of an electrically insulating but non-magnetic material which also serves as a printed circuit board, and secured to the top of this plate are 22 upright spacers 35, seen best in FIG. 5, which divide the space between plate 33 and plate 27 into twenty one channels 36A through 36U extending up-and-down the panel 27 and respectively under the slots 31A through 31U. Considering first the channel under slot 31A, this contains a code bar 37A formed of electrically insulating non-magnetic material but provided with a number of ferromagnetic plugs 39 arranged in four groups shown most clearly in FIG. 7. These plugs extend right through the code bar 37A. Firmly attached to and extending upwardly from the top of code bar 37A is a mounting rod 41A which extends upwardly through a slot 43A in a dial plate 45A, and through the top plate 27, and at its upper end carries a knob 47A. By movement of the knob 47A, the code bar 37A and the dial plate 45A can be moved along the channel 36A.

It is to be noticed that the slot 43 is of such length that there can be lost motion between movement of rod 41A and the consequent movement of the dial plate 45A, and the reason for this will become clear in the description of the operation of the device. Mounted on the dial plate 45A is a foam rubber drag pad 49A which frictionally engages the underside of the top plate 27, and prevents movement of the dial plate 45A except under the action of rod 41A.

Figure 6:
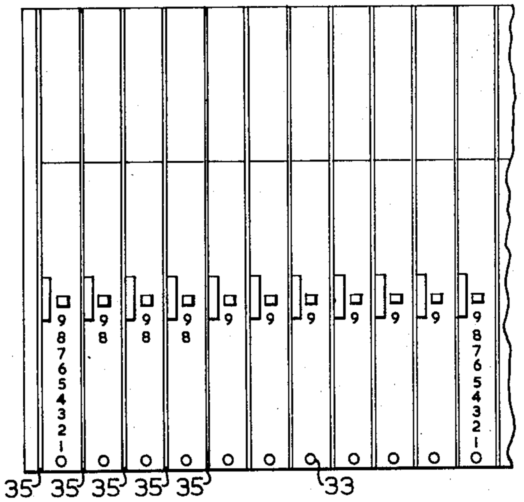
FIG. 6 is a sectional plan view taken on the line VI—VI of FIG. 4.

Dial plate 45A bears the indicia 0 through 9 as shown in FIG. 6, and the arrangement is such that as dial plate 45A is moved along the channel 36A, each of these numerals appears in sequence at the window 29A. Code bar 37A also partakes in this movement.

Each of the channels 36A through 36U is similarly provided with a code bar, a mounting rod, a dial plate and a knob, numbered to correspond with the channel involved, e.g. the knobs are numbered 47A through 47U.

As indicated in FIG. 2, these 21 knobs are used to set in respectively 21 decimal digits, which are grouped as follows:

digits 1 and 2: an indication of origin of the transmission, i.e. of the hospital submitting the information to the computer.
digits 3 to 5: a numeral providing a categorization of the patent.
digits 6 to 11: patient's file number.
digits 12 and 13: patient's height.
digits 14 to 16: patient's weight.
digits 17 and 18: patient's age.
digit 19: patient's sex.
digit 20: patient's blood pressure.
digit 21: patient's medication status.

Figure 7:
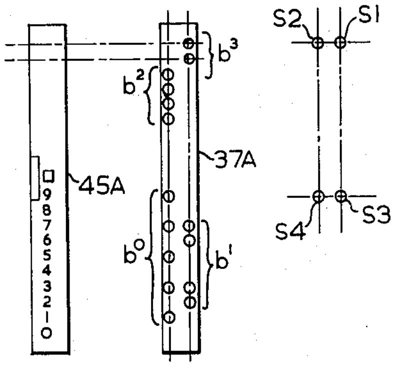
FIG. 7 is a diagram showing the relative dimensioning and positions of a slide plate, a code bar and four reed switches in the device of FIGS. 2 through 6.

As mentioned above, the plate 33 also serves as a printed circuit board. Mounted on it are a number of reed switches, there being four such switches associated with each of the channels 36A through 36U, for each channel each switch being associated with one only of the four groups of plugs 39. FIG. 7 shows in horizontal alignment the relative positions of the dial plate 45A, the associated code bar 37A, and the four associated reed switches S1, S2, S3 and S4 which the dial plate 45A is set to show its numeral 9 at the window 29A. When one of ferromagnetic plugs 39 is positioned above one of the reed switches, that switch is set to the "on" position in which its contacts are closed. When no plug 39 is close to the reed switch, it will be set to its "off" position. Since the magnetic field required to hold a reed switch in the 1 state is less than that required to set it in that state, care is necessary to ensure that resetting of the code bar involves a sufficient travel to reduce the field produced by the plugs 39 to below the "hold" level. This is the function of the mechanical lost motion introduced into the system by the use of slot 43A to accommodate the rod 41A. By moving the knob 41A forwardly to bring numeral 9 into window 29A, and then resetting the knob to produce the desired numeral into window 29A, one is assured that none of the reed switches is left in the on position despite the resetting of the dial plate.

The following chart shows the state of the four reed switches S1 through S4 for each setting of the dial plate 45A. It will be appreciated that a similar setting of the reed switches associated with each channel is produced by adjustment of the dial plate associated with that channel. These reed switches are numbered sequentially from S1 through S84 and for example switches S33, S34, S35 and S36 are associated with code bar 37I.

| Setting of dial plate 45A | State of reed switches S4 | S3 | S2 | S1 |
|---|---|---|---|---|
| 9 | 1 | 0 | 0 | 1 |
| 8 | 0 | 0 | 0 | 1 |
| 7 | 1 | 1 | 1 | 0 |
| 6 | 0 | 1 | 1 | 0 |
| 5 | 1 | 0 | 1 | 0 |
| 4 | 0 | 0 | 1 | 0 |
| 3 | 1 | 1 | 0 | 0 |
| 2 | 0 | 1 | 0 | 0 |
| 1 | 1 | 0 | 0 | 0 |
| 0 | 0 | 0 | 0 | 0 |

Disposed in the housing 21 below the plate 33 is a further printed circuit board 61, and below this an arm 63 formed of a non-magnetic plastics material and mounted on the vertical output shaft 65 of an electric motor M1. The arrangement is such that this arm is rotated continuously at a speed of 24 revolutions per minute. This arm carries (see FIG. 8) at one end a small permanent magnet 69 arranged with its magnetic axis normal to the disc, and 20 reed switches are mounted on the printed circuit board 61, distributed along a circle 70 lying immediately adjacent the locus of the magnet 69. As the arm 63 rotates, the magnet 69 passes in turn each of the 20 reed switches and as it passes each it first sets it to the 1 state and then permits it to relapse to the 0 state.

Figure 8:
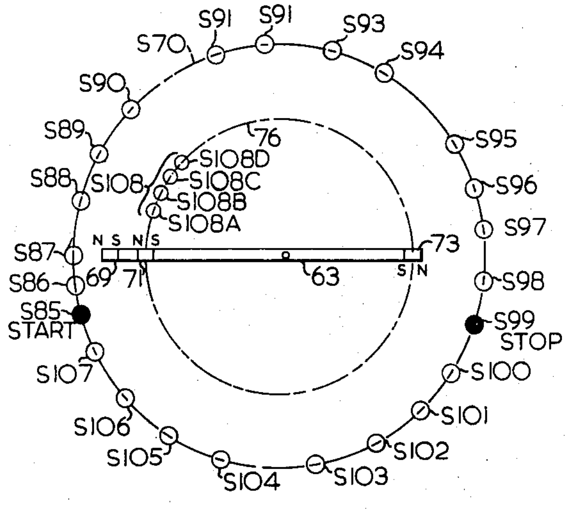
FIG. 8 is a plan view of a reed switch operating disc shown in FIG. 4.
Figure 8A:
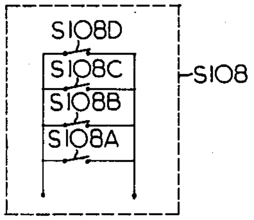
FIG. 8A shows a detail thereof.

The arm 63 also carries two further permanent magnets 71 and 73 arranged both to lie on the circumference of a circle 76 of lesser diameter than circle 70. These two magnets coact with a reed switch group S108 carried by the circuit and comprising four reed switches S108A, S108B, S108C, and S108D arranged over an arc of circle 76 and connected as shown in FIG. 8A. In FIG. 8, the direction of rotation of arm 63 is indicated by the arrow 79. As magnet 71 approaches switch S108A, this switch will close; before this reed opens, (as magnet 71 passes the switch) switch S108B will close; similarly switches S108C and S108D close. Thus, by the positioning of these four switches forming switch group S108, switch group S108 is closed for 36° movement of scan by the arm 63. This will happen twice during each rotation of the arm 63, by the provision of the two magnets 71 and 73.

FIGS. 9A through 9F, when arranged as shown in FIG. 9G, show the electrical circuit for the physicological data transmitter 9. To facilitate identification of leads which link the parts of the circuit shown respectively on different sheets, such leads are designated by the numerals Z1 through Z43, in each case such a numeral being used to indicate different parts of the same electrical lead.

The electrical and electronic components utilized in the circuit are represented by conventional symbols, and supplied with reference numerals which are listed below with an indication of the most important electrical characteristic of the component concerned:

RESISTORS

| Reference | Value | See Figure: |
|---|---|---|
| R1 | 20 megohms | 9A |
| R2 | 1,000 ohms | 9A |
| R3 | 1,000 ohms | 9A |
| R4 | 470 ohms | 9A |
| R5 | 8,200 ohms | 9A |
| R6 | 10,000 ohms | 9A |
| R7 | 47,000 ohms | 9A |
| R8 | 470,000 ohms | 9A |
| R9 | 33,000 ohms | 9A |
| R10 | 1,000 ohms | 9A |
| R11 | 5,600 ohms | 9A |
| R12 | 3,300 ohms | 9A |
| R13 | 470,000 ohms | 9A |
| R14 | 5,600 ohms | 9A |
| R15 | 3,300 ohms | 9A |
| R16 | 5,600 ohms | 9A |
| R17 | 3,900 ohms | 9A |
| R18 | 470,000 ohms | 9A |
| R19 | 5,600 ohms | 9A |
| R20 | 3,300 ohms | 9A |
| R21 | 3,900 ohms | 9B |
| R22 | 3,300 ohms | 9B |
| R23 | 1,000 ohms | 9B |
| R24 | 5,600 ohms | 9B |
| R25 | 680 ohms | 9B |
| R26 | 150,000 ohms | 9B |
| R27 | 3,300 ohms | 9B |
| R28 | 5,600 ohms | 9B |
| R29 | 1,000 ohms | 9B |
| R30 | 5,600 ohms | 9B |
| R31 | 150,000 ohms | 9B |
| R32 | 470 ohms | 9B |
| R33 | 3,300 ohms | 9B |
| R34 | 470,000 ohms | 9B |
| R35 | 5,600 ohms | 9B |
| R36 | 1,200 ohms | 9B |
| R37 | 3,700 ohms | 9B |
| R38 | 470,000 ohms | 9B |
| R39 | 5,600 ohms | 9B |
| R40 | 1,200 ohms | 9B |
| R41 | 3,300 ohms | 9B |
| R42 | 470,000 ohms | 9B |
| R43 | 5,600 ohms | 9B |
| R44 | 150,000 ohms | 9B |
| R45 | 220 ohms | 9B |
| R46 | 33,000 ohms | 9B |
| R47 | 33,000 ohms | 9B |
| R48 | 15,000 ohms | 9E |
| R49 | 10,000 ohms | 9F |
| R50 | 10,000 ohms all in | 9F |
| R51 | 6,800 ohms | 9F |
| R52 | 470 ohms | 9F |
| R53 | 1,800 ohms | 9F |
| R54 | 1,000 ohms | 9F |
| R55 | 33,000 ohms | 9F |
| R56 | 150,000 ohms | 9F |
| R57 | 3,300 ohms | 9F |
| R58 | 150,000 ohms | 9F |
| R59 | 5,600 ohms | 9F |
| R60 | 4,700 ohms | 9F |
| R61 | 1,000 ohms | 9F |
| R62 | 5,000 ohms all in | 9E |
| R63 | 470 ohms | 9E |
| R64 | 120,000 ohms | 9E |
| R65–R76 | 82,000 ohms each | 9D |
| R77–R84 | 82,000 ohms each | 9E |
| R85 | 5,000 ohms all in | 9E |
| R86 | 68 ohms | 9E |
| 87 | 3,300 ohms | 9F |
| R88 | 68,000 ohms | 9F |
| R89 | 1,000 ohms | 9F |

CAPACITORS (values in microfarads)

| | | |
|---|---|---|
| C1 | 0.01 | 9A |
| C2 | 0.01 | 9A |
| C3 | 1. | 9A |
| C4 | 0.22 | 9A |
| C5 | 0.01 | 9A |
| C6 | 0.22 | 9A |
| C7 | 0.22 | 9A |
| C8 | 0.22 | 9A |
| C9 | 1. | 9A |
| C10 | 1. | 9A |
| C11 | 1. | 9A |
| C12 | 1. | 9A |
| C13 | 1. | 9B |
| C14 | 0.47 | 9B |
| C15 | 1. | 9B |
| C16 | 0.01 | 9B |
| C17 | 0.01 | 9B |
| C18 | 1. | 9B |
| C19 | 0.47 | 9B |
| C20 | 1. | 9B |
| C21 | 0.47 | 9B |
| C22 | 1. | 9B |
| C23 | 0.47 | 9B |
| C24 | 1. | 9B |
| C25 | 330. | 9F |
| C26 | 330. | 9F |
| C27 | 0.022 | 9F |
| C28 | 1. | 9F |
| C29 | 1. | 9F |
| C30 | 1. | 9F |
| C31 | 0.01 | 9F |
| C32 | 0.022 | 9F |
| C33 | 100. | 9F |
| C34 | 47 | 9F |

DIODES

| | | |
|---|---|---|
| D1 | type 1N649 | 9A |
| D2 | 1N649 | 9A |
| D3 | 1N270 | 9A |
| D4 | 1N270 | 9A |
| D5 | 1N649 | 9A |
| D6 | 1N649 | 9A |
| D7 | 1N756A | 9A |
| D8 | 1N649 | 9A |
| D9 | 1N469 | 9A |
| D10 | 1N756A | 9A |
| D11 | 1N270 | 9B |
| D12 | 1N649 | 9B |
| D13 | 1N649 | 9B |
| D14 | 1N270 | 9B |
| D15 | 1N649 | 9B |
| D16 | 1N649 | 9B |
| D17 | 1N649 | 9B |
| D18 | 1N649 | 9B |
| D19 | 1N649 | 9B |
| D20 | 1N649 | 9B |
| D21 | 4E20—8 Shockley | 9F |
| D22—D103 | 1N649 | 9C |
| D104—D117 | 1N649 | 9D |
| D118—D129 | 1N649 | 9E |
| D129 | 1N270 | 9E |
| D130 | 1N649 | 9E |
| D131 | 3.3 volts Zener | 9F |

SILICON CONTROLLED RECTIFIERS

| | | |
|---|---|---|
| SCR1 | type 2N5061 | 9A |
| SCR2 | 2N5061 | 9A |
| SCR3 | 2N5061 | 9A |
| SCR4 | 2N 5061 | 9A |
| SCR5 | 2N5061 | 9B |
| SCR6 | 2N5061 | 9B |
| SCR7 | 2N5061 | 9B |
| SCR8 | 2N5061 | 9B |
| SCR9 | 2N5061 | 9B |
| SCR10 | 2N5061 | 9B |
| SCR11 | 2N5061 | 9F |
| SCR12 | 2N5061 | 9F |

SWITCHES

Figure 9A:
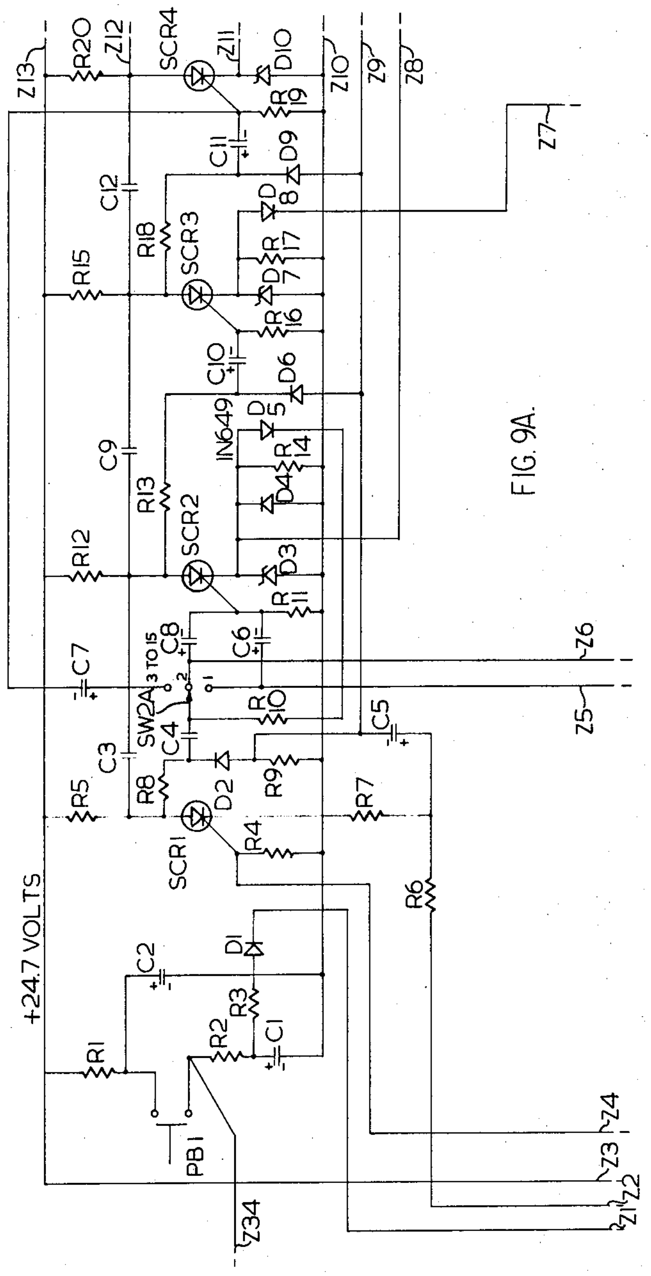

PB1 — push-button normally open start switch: FIG. 9A

SW2 — 15-position derivation switch having four switch poles or blades labelled and positioned as follows:

| | | |
|---|---|---|
| SW2A | FIG. 9A | |
| SW2B | 9B | |
| SW2C | 9C | |
| SW2D | 9D | (contacts only FIG. 9E) |

In the drawings, the fixed contacts 1 through 15 are indicated by numerals adjacent the moving switch blades, except where only contacts 1 through 13 are used. Positions 14 and 15 are not used in the present equipment.

Figure 9B:
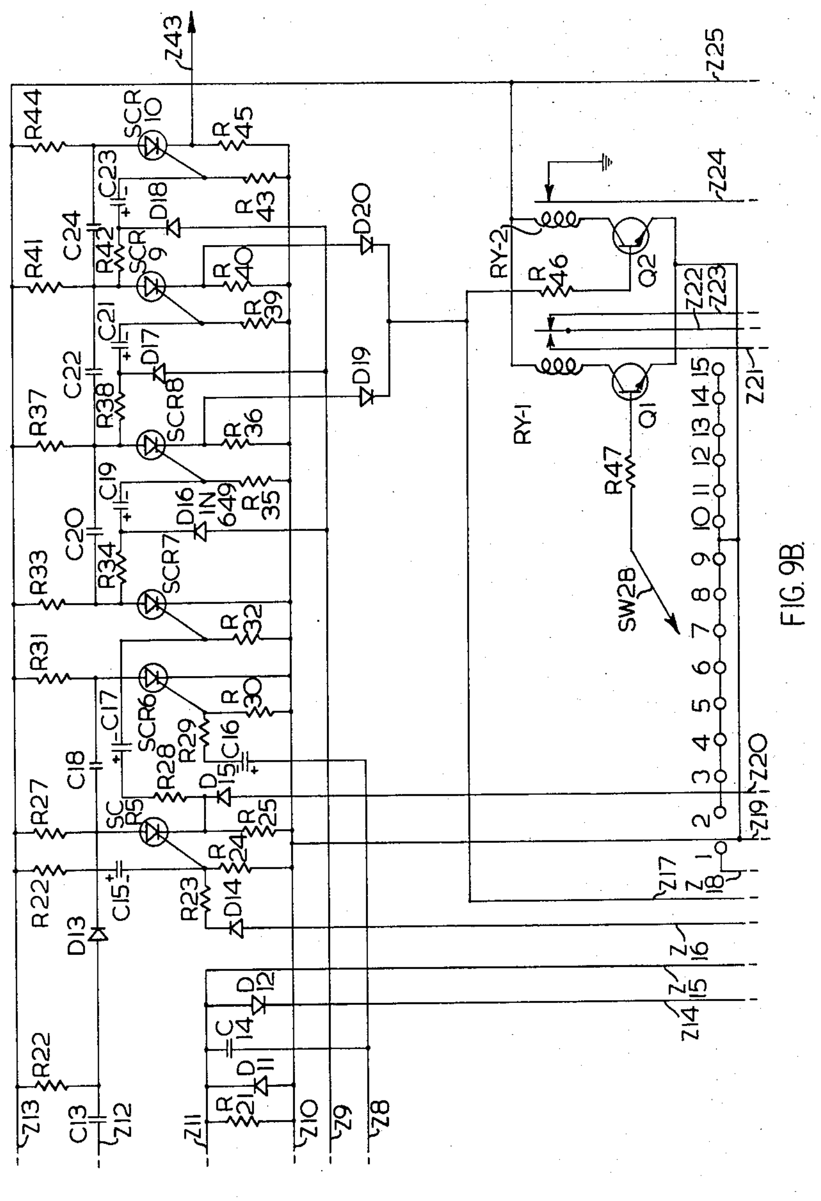
Figure 9C:
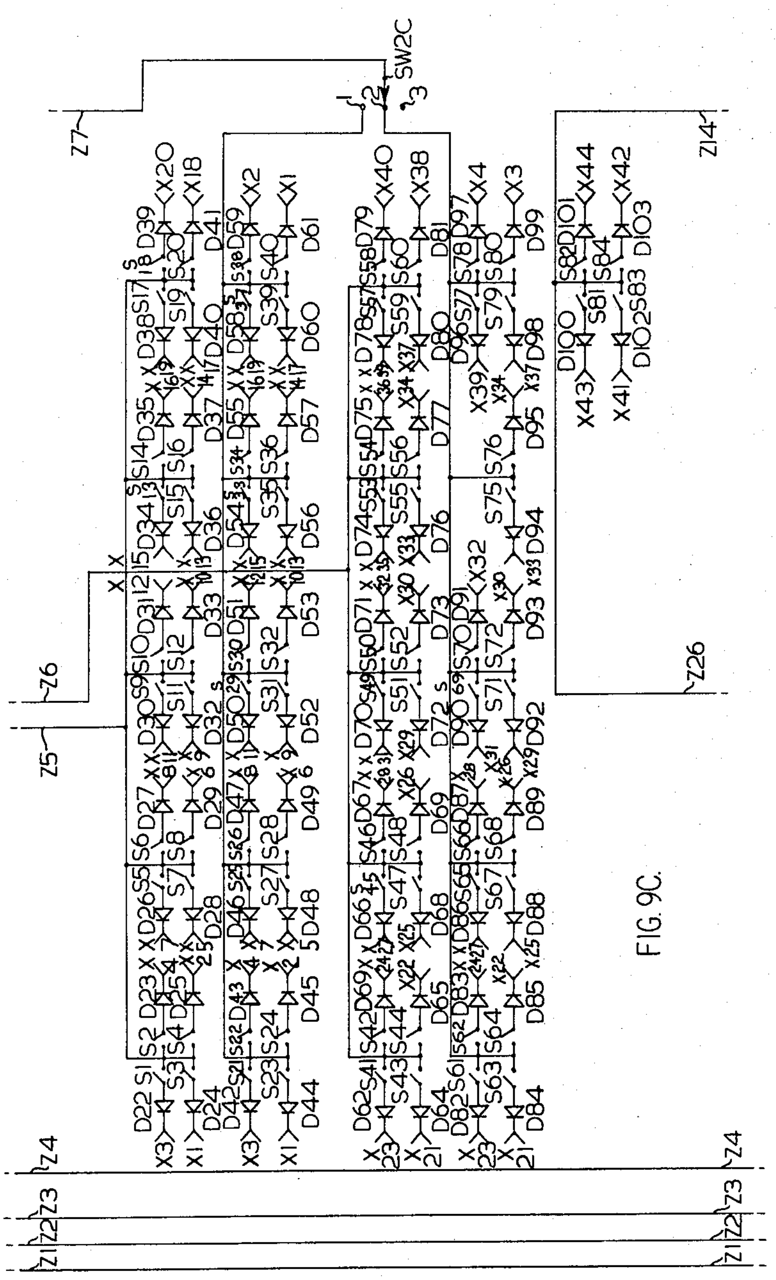
Figure 9D:
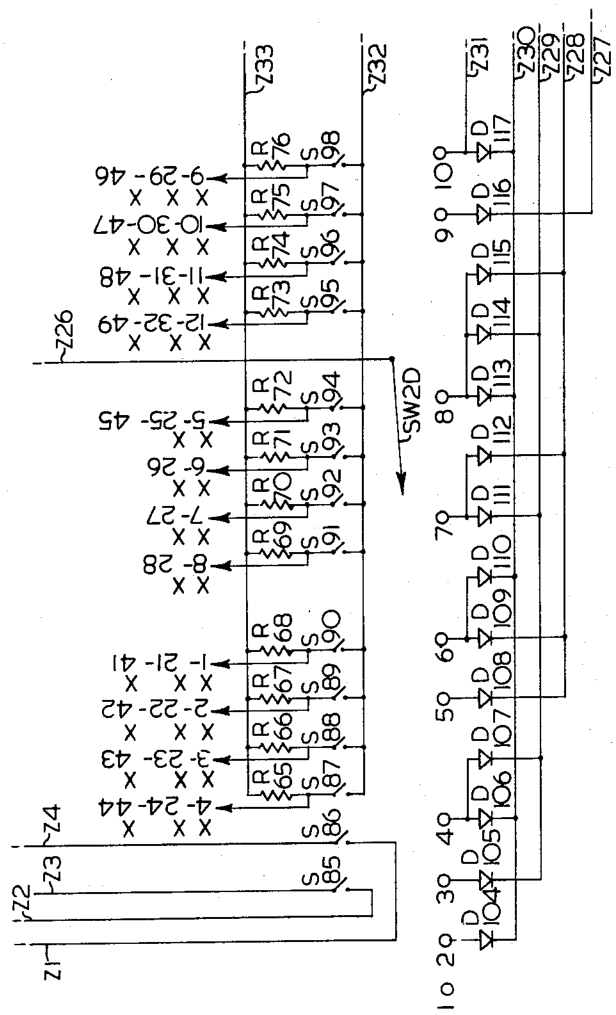
Figure 9E:
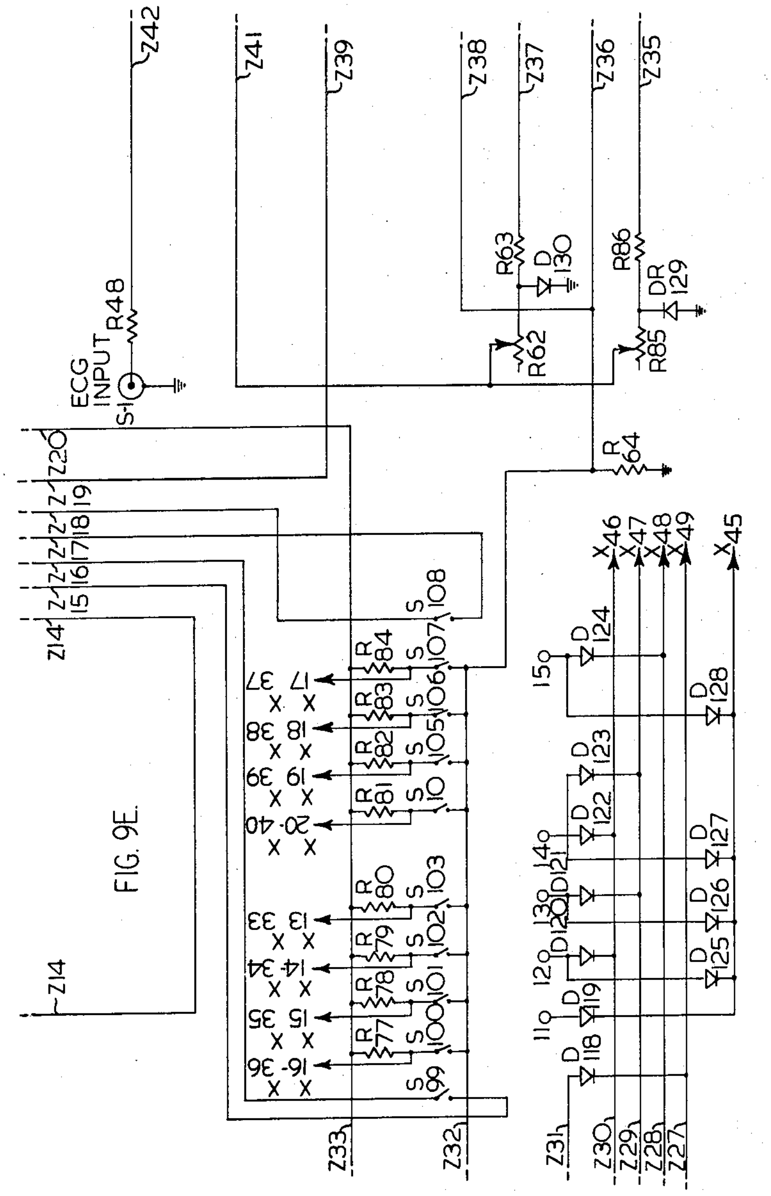
Figure 9F:
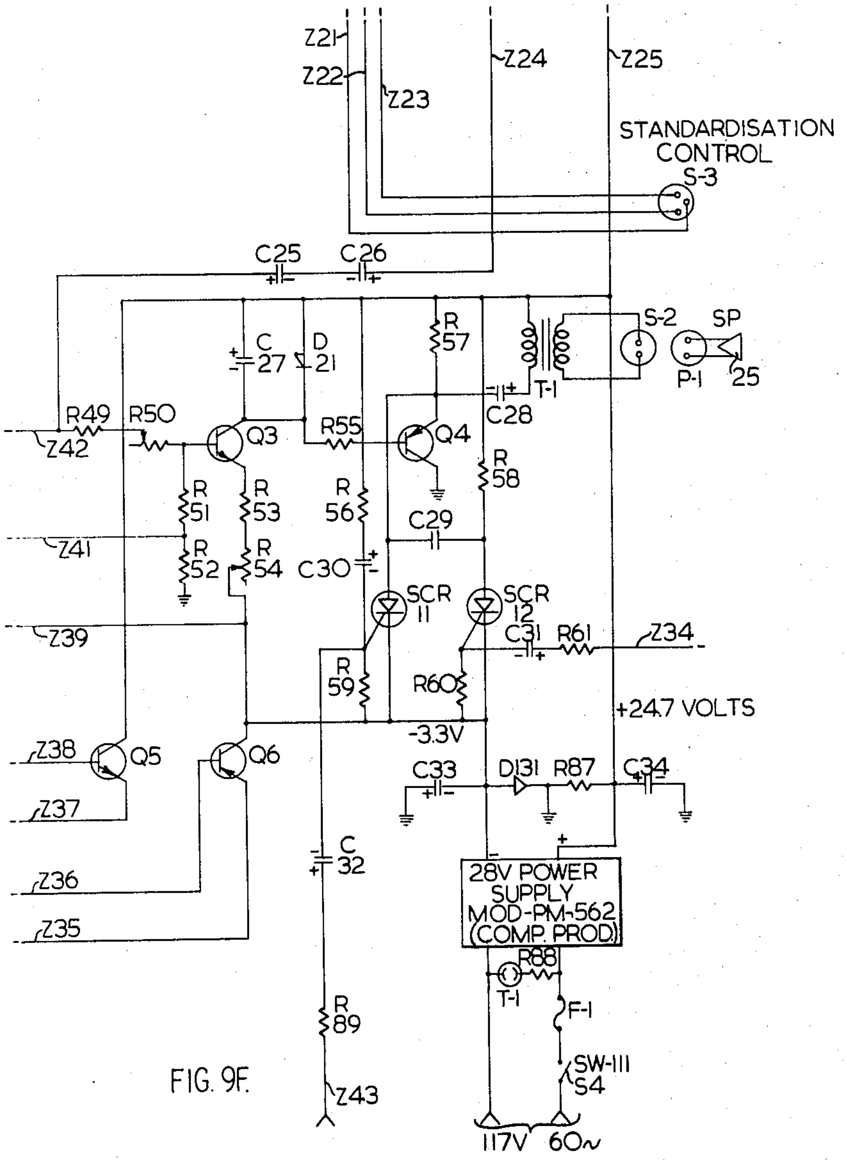

S4 — mains on-off switch FIG. 9F

REED SWITCHES: all type

| | | |
|---|---|---|
| S1 through S72 | see FIG. 9C | type MMR-2-185 (Hamlin) |
| S75 through S84 | see FIG. 9C | type MMR-2-185 (Hamlin) |
| S85 through S98 | see FIG. 9D | type MSRR-2-185 (Hamlin) |
| S99 through S108 | see FIG. 9E | type MSRR-2-185 (Hamlin) |

RELAYS

| | | | | |
|---|---|---|---|---|
| RY1 | type | 5C11DA | 24 volts | FIG. 9B |
| RY2 | type | 5C11DA | 24 volts | 9B |

POWER SUPPLY

PS1 — this is a standard power supply energized by 117 volts 60 cps and providing a 28 volts d.c. output See FIG. 9F.

| | |
|---|---|
| TRANSFORMERS | |
| T1 | FIG. 9F |
| INDICATOR LAMP | |
| I-1 this is a standard neon indicator lamp. | FIG. 9F |
| FUSE | |
| F1 | FIG. 9F |
| CONNECTOR | |
| S-3 female connector | FIG. 9F |

Standardization Control S-3 is a female connector. A cable from this connector to the ECG recorder provides for Relay RL1 to chop the calibration voltage supply (in normal operation of ECG recorder this voltage is chopped by a push button on the ECG recorder) in the ECG recorder providing a calibration signal via line 11 FIG. 1, when transmitter and recorder are in the standardization position.

INPUT SOCKET

S1 — is a co-axial socket which accepts one end of the lead 11 of FIG. 1.

TRANSISTORS

| | | | |
|---|---|---|---|
| Q1 | type | 2N1613 | FIG. 9B |
| Q2 | | 2N1613 | 9B |
| Q3 | | 2N1613 | 9F |
| Q4 | | 2N1132 | 9F |
| Q5 | | 2N1613 | 9F |
| Q6 | | 2N1132 | 9F |

INTERCONNECTIONS

Interconnections from one sheet of drawings to another and between items on the same circuit are numbered as below, the locations of the various connections being shown

| | | | |
|---|---|---|---|
| Z1 to Z4 | FIGS. 9A | 9C | 9D |
| Z5 to Z7 | 9A | 9C | |
| Z8 to Z13 | 9A | 9B | |
| Z14 | 9B | 9E | 9C |
| Z15 to Z20 | 9B | 9E | |
| Z21 to Z25 | 9B | 9F | |
| Z26 | 9C | 9D | |
| Z27 through Z33 | 9D | 9E | |
| Z34 | 9A | 9F | |
| Z35 through Z42 | 9E | 9F | |
| Z43 | 9B | 9F | |

Interconnections between points are in some cases left out merely to avoid a multiplicity of crossing lines which would tend to render the printed drawing difficult to read. Where this has been done, reference have been given to the missing interconnecting leads, e.g. lead X34 (not shown) connects two similarly numbered points.

| | |
|---|---|
| X1 through X12 | FIGS. 9C and 9D |
| X13 through X20 | FIGS. 9C and 9E |
| X21 through X32 | FIGS. 9C and 9D |
| X33 through X40 | FIGS. 9C and 9E |
| X41 through X44 | FIGS. 9C and 9D |
| X45 through X49 | FIGS. 9D and 9E |

Motor

The motor M1 is a geared motor and has an output shaft driven at a steady speed of 24 revolutions per minute. Its speed is not critical.

The use of the apparatus described above will now be detailed, and at the same time the action and interaction of the various parts of the apparatus will be described in detail.

In operation, for a 12 derivation ECG recording, 13 transmissions are required by the physiological data transmitter. Referring to FIG. 1, there are five of the leads 3 connected in an appropriate manner to the selected parts of the patient, and the 12 derivation positions denote various combinations of the five leads.

The patient 5 has the ECG electrodes attached to various parts of his body according to a predetermined plan or scheme, that is to say that a position say 3 will always be a specified pattern of leads connected to certain specified parts of the body of the patient. The various leads are connected in the usual manner to the ECG recorder 1, and up to 12 leads, allotted the numbers 1 through 12, can be utilized in this manner. However, the selection of which lead to be monitored must be effected by the operator, i.e. the apparatus described herein does not select which lead is to be monitored. It transmits only data from a selected lead.

A telephone link is established in routine manner between a telephone terminal associated with the telephone handpiece 23 and the computer input terminal 15. The telephone handpiece is then positioned as shown in FIG. 2 with its microphone 23M resting on the loudspeaker 25 of the transmitter 9.

In order to obtain a computer analysis of a set of 12 separate outputs from electrodes attached to the patient, it is necessary first to connect the electrodes to the patient, and to set up on the transmitter the appropriate details relating to the patient. At this point it is convenient to study FIG. 11, which indicates what information or data is to be transmitted to the computer. In all, 13 transmissions will be sent to the computer, and each of these will be initiated by first setting the derivation switch SW2 to the number of the desired next transmission, and then pressing the start-to-transmit button PB1. Thus the first transmission involves setting that switch to the position 1. During this first transmission, item 1 is a set of four binary digits together indicating the first decimal number set up by knob 47A. Item 2 is a second set of four binary digits together indicating the second decimal number set up by the knob 47B. These two decimal numbers together form a code number identifying the hospital sending in the data for analysis. Items 3, 4 and 5 are respectively three more sets of four binary digits, the three sets representing the decimal numbers set in by the knobs 47C, 47D and 47E. Together, these three decimal digits define a category into which the patient falls. Items 6, 7, 8, 9, 10 and 11 are six more sets of binary digits, these sets representing respectively the decimal numbers set in by the knobs 47F, 47G, 47H, 47I, 47J and 47K, and the decimal number being the file number of the patient concerned. Items 12 and 13 are two more sets of four binary signals which define the two decimal numbers defining the number of the ECG electrode position being monitored during that transmission. During this first transmission, no ECG electrode position is monitored, so that the decimal number transmitted is 00. Following the binary digits of item 13, is a short pause followed by a series of calibration pulses.

Once the first transmission is finished (which takes six revolutions of the disc 63, and thus about 15 seconds), the operator changes the derivation switch to its second position. The 1st and 2nd items transmitted are sets of four binary digits which represent the two decimal numbers set in by knobs 47L and 47M, these indicating the height of the patient in inches. The 3rd, 4th and 5th items transmitted are sets of four binary digits which represent the three decimal numbers set in by knobs 47N, 47O and 47P, these indicating the weight of the patient in pounds. The 6th and 7th items transmitted are sets of binary digits which represent the two decimal numbers set in by knobs 47Q and 47R, these indicating the age of the patient in years. The 8th item transmitted is a set of four binary digits which represent the decimal number set in by knob 47S, this in turn indicating the sex of the patient. Item 9th is a single set of four binary digits representing the decimal number set in by knob 47T, and indicating to a preselected code the blood pressure of the patient. Item 10 is a set of four binary digits representing the decimal number set in by knob 47U, and indicating to a code the medication status of the patient. Item 11 is a set of four binary digits representing the decimal number set in by knob 47K, i.e. a repeat of the final number of the file number of the patient. Items 12 and 13 of this transmission are two sets of four binary digits representing the two decimal digits of the number of the ECG transmission involved. The number is 01 for this transmission. After a brief pause, the actual ECG from the patient is transmitted.

Transmissions 3 through 13 follow the same pattern: the transmission of a set of four binary digits representing the last decimal digit of the file number of the client; the transmission of two sets of four binary digits representing the two decimal digits of the number of the ECG being transmitted (not the number of the transmission); and the transmission of the appropriate actual ECG from the patient.

From a consideration of FIG. 11, it will be seen that a convenient grouping of the decimal digits selected by the knobs 47A through 47U can be chosen as indicated in FIG. 10:

Group A: the five decimal digits selected by the first five decade knobs 47A through 47E;

Group B: the five decimal digits selected by the next five decade selector knobs 47F through 47J;

Group C: the single decimal digit selected by the decade selector knob 47K;

Group A': the five decimal digits selected by the next five decade knobs 47L through 47P;

Group B': the five decimal digits selected by the last five decade knobs 47Q through 47U.

FIG. 10 also indicates how the reed switches associated with slide bars 37A, 37F, 37K, 37L, and 37Q are all associated with scanned reed switches S87 through S90. In a similar manner, the reed switches associated with slide bars 37B, 37G, 37M 37R and the output lead X45 of the diode matrix are associated with scanned switches S91 through S94; the reed switches associated with slide bars 37C, 37H, 37N and 37S and the output leads X46 through X49 of the diode matrix are associated with scanned switches S95 through S98; the reed switches associated with slide bars 37D, 37I, 37O and 37T are associated with scanned switches S100 through S103; and the reed switches associated with slide bars 37E, 37J, 37P and 37U are associated with scanned switches S104 through S107.

The detailed operation of the circuitry, as distinct from the operation of the whole equipment, will now be given. By way of explanation, the term "triggered ON", when used below in relation to the operation of a silicon controlled rectifier, implies that the SCR involved, when triggered, maintains its ON state and requires the operation of a further active network to turn it off. On the other hand, when a silicon controlled rectifier is said to be "triggered", the implication is that this SCR is biased below its holding current and will turn itself off.

The motor M1 will be running, and while the reed switches of the various decades will be preset, the reed switches S85 through S107 positioned round the periphery of the arm 63 will be open (and allowed to close) in sequence during each revolution of the disc. When the push-button PB1 is pressed, an unmodulated carrier signal will appear at the speaker SP1 (FIG. 9F) for a short period depending upon the position of the scanning magnet 69 at the time the press button was pushed. It will be between about one or two revolutions of the arm, i.e. a time interval of between 2.5 and 5 seconds. Before the switch PB1 is closed, the capacitor C2 will have been charged through the resistor R1. When switch PB1 is closed, a portion of the charge in capacitor C2 (FIG. 9A) is coupled via resistor R61 (FIG. 9F) and capacitor 31 to the trigger electrode of SCR 12, to trigger this SCR, which in turn turns off SCR 11 via capacitor C29.

SCR11 is normally in the ON state, a condition set up either by the initial application of power when switch S4 is closed or by SCR10 providing a trigger-ON pulse via resistor R89 and capacitor C32 at the termination of circuit operation. The turning off of SCR 11 removes the clamping action on the emitter of transistor Q4 (FIG. 9F), freeing this transistor for its use as an emitter follower coupling the output of a 2Kcps oscillator, formed by transistors Q3 and Q4 and four layer diode D21, to the loudspeaker 25 through the transformer T1.

As mentioned above, part of the charge on capacitor C2 is used, and the remaining charge in this capacitor, following the triggering of SCR 12, is shared with and temporarily stored in capacitor C1 (FIG. 9A). The storage time is determined by the time required for the scan magnet 69 mounted on the arm 63 to move from the position it was in when switch PB1 was closed, until the magnet operates reed switch S86. When switch S86 (FIG. 9D) is closed, the charge on Capacitor C1 triggers -ON SCR1, via resistor R3 and diode D1. This triggering action depletes the charge on Capacitor C1, thus preventing the triggering -ON of SCR1, following its turn off by SCR2, by subsequent actuations of reed switch S86.

The turn ON of SCR1 removes a back bias from diode D2, allowing this diode to pass any trigger pulses produced by the closure of reed switch 85 (FIG. 9D). Following a further rotation of 350° by the disc 63, the scan magnet 69 closes reed switch S85, so coupling through a network consisting of resistor R6, capacitor C5, and diode D2, a trigger -ON pulse to SCR2. As SCR2 turns on, SCR1 is turned off by a pulse through capacitor C3. At this time, the transmission of the unmodulated carrier is stopped. The transmitter remains activated from closure of push button PB1 to completion of any ECG pattern or calibration signal.

The next step is the transmission of a series of binary coded digits as described above. Up to this point, since SCR2 has been OFF, it has not been possible for such digits to be transmitted despite the fact that the scanning magnet 69 has been operating the various reed switches during every rotation of the arm 63. To provide for read out of binary bits, it is necessary to apply respectively positive and negative binary bit forming voltages at the decade switches and at the common junctions of resistors R65 through R84. Up to now, these have been at zero voltage level. Positive voltage for binary 1 signals is obtaned, in turn, from each emitter of the sequentially triggered -ON SCRs SCR2, SCR3 and SCR4, and is coupled to the appropriate decade network via diodes D5, D8 and D12 on leads Z5, Z7 and Z14. The diodes are provided to block the negative voltages which appear on the emitters of these SCRs when they are in the off state. Negative voltage for binary 0 signals is obtained at the emitter of SCR5 (see FIG. 9B) and is coupled to the common junction of resistors R65 through R84 through diode D15 (FIGS. 9B, 9E and 9D, lead Z20). The diode D15 serves to block the positive voltage which appears on the emitter of SCR5 prior to the turn off of SCR5 by the trigger-ON of SCR1.

The transmission of digits as set up by the first five programming switches (Knobs 47A through 47E) is initiated by the action of reed switch 85 triggering-ON SCR2 which in turn turns off SCR1. When SCR2 turns ON, its emitter voltage is raised from a negative to a positive level by an amount determined by the Zener Diode D3 (FIG. 9A). This diode provides for a constant emitter voltage in lieu of variable current demands, a function of the digits selected in Groups A and A' of the decade programming switches.

The positive emitter voltage of the triggered-ON SCR2 is coupled via diode D5, resistor R10, switch blade SW2A, and associated contact 1 through lead Z5 to the common terminals of reed switches S1 through S20, forming group A mentioned earlier.

When SCR2 is triggered-ON, the positive output of the emitter of SCR2, coupled via lead Z8, capacitor C16 and resistor R29, triggers SCR6. Triggering of SCR6 via capacitor C18 turns off SCR5. This turn-off of SCR5 provides a negative emitter voltage applied through diode D15 and lead Z20 to the common terminals of resistors R65 through R84 (FIGS. 9E and 9D). A negative voltage at this point enables the read out of negative pulses for binary 0.

Following the actuation of reed switches S85 and S86 by the scan magnet 69, reed switch S87 will be momentarily closed. The voltage at the junction of switch S87 and resistor R65 will be negative if switch S2 is open, since it is derived from the common lead Z33, but if switch S2 is closed, then this voltage at the junction of switch S87 and resistor R65 will be the positive voltage applied by lead Z5. The sign of the binary signal is thus determined by the voltages applied to leads Z33 and Z5, and by the status of switch S2. This binary signal voltage is read out (for switch S2) only when switch S87 is closed, and is applied as an output signal on lead Z32.

It will be seen that as switches S87, S88, S89 and S90 are closed (in a break-before-make manner) in sequence, the voltage on lead Z32 will consist of a group of four binary voltage pulses which will indicate uniquely the conditions of the four switches S2, S1, S4, S3. In the read-out of these binary coded digits, the proper order is maintained so that the most significant bit is read out first.

In a similar manner, operation of switches S91, S92, S93 and S94 provide a binary read out of switches S6, S5, S8 and S7 of the second decimal number; operation of switches S95, S96, S97 and S98 provide a read out of switches S10, S9, S12, and S11 of the third decimal number; operation of switches S100, S101, S102 and S103 provide a binary read out of switches S14, S13, S16 and S15 of the fourth decimal number; operation of switches S104, S105, S106 and S107 provide a binary read out of switches S18, S17, S20 and S19 of the fifth decimal number.

Reed switch S85 is again operated by the scanning magnet 69, and this triggers-ON SCR3 via lead Z2, resistor R6, capacitor C5 and diode D6. This triggering ON of SCR3 turns off SCR2 via capacitor C9. The positive voltage now at the emitter of SCR3 is coupled via diode D8, lead Z7 switch blade SW2C and terminal 1 to the common poles of the reed switches S21 through S40 associated with the decade switches in Group B.

The switches S87 through S108 are then scanned again in seqence by the scan magnet 69 of the disc 63, and this time provides binary read-out of the reed switches S41 through S80. It will be noted that again this binary read-out appears on lead Z32 of FIG. 9D.

Actuation of switch S85 for a third time applies a trigger-ON signal through lead Z2, resistor R6, capacitor C5 and diode D9 the SCR4. Triggering-ON of this SCR turns off SCR3 via capacitor C12, and raises to a positive level the emitter of SCR4. This positive level is coupled via diode D12 and lead Z14 to the common poles of reed switches S81 through S84 of the 11th decade forming Group C, and also to the moving blade SW2D, which is in contact with terminal 1 to which no other connection is made.

During this rotation of the arm 63, reed switches S87 through S90 are connected in sequence to switches S82, S81, S84 and S83 and provide a binary readout of the setting of this decade switch. Reed switches S91 through S98 are operated in sequence to provide a binary read-out decimal digits which indicate the position of the switch SW2.

It will be seen that the diodes D104 through D128 form a diode matrix which serves as a decimal to binary coder for the switch SW2. The four connections X46 through X49 provide four binary bits which are needed to represent the "units" digit of the decimal number. Since the "tens" digit of the decimal number in this application can only be 1 or 0, it is sufficient to supply just one binary bit on connection X45. However, for this matrix to work, a positive voltage must be applied by the switch blade SW2D to the appropriate terminal 2 through 15. When switch SW2 is in the first position, blade SW2D engages contact 1 (shown in FIG. 9D) which has no other connection, so that the output from each of the reed switches S91 through S98 as they are scanned is a 0. This is in order, since during the first transmission no actual ECG is being transmitted.

Reed switch S99 now closes and couples the positive voltage at the emitter of SCR4 via diode D14 and resistor R23 to SCR5 and triggers-ON that SCR. This turns off SCR4 through diode D13 and capacitor C13. The diode D13 serves to prevent the premature turn off of SCR5 when SCR1 was triggered-ON.

The turn off of SCR4 removes the positive voltage on the common poles of reed switches S81 through S84, and switch blade SW2D (FIG. 9D), and the triggering-ON of SCR5 and the raising of its emitter from a negative to a positive level, removes the negative voltage from the common termination of resistors R65 through R84. This prevents further read-out of positive or negative pulses as reed switches S87 through S106 are actuated during the remaining portion of the scan magnet's third cycle.

After read out of the binary digits is terminated, an unmodulated carrier at 2 Kcps is transmitted. At the time that SCR5 is triggered-ON (when reed switch S99 is actuated), its emitter is raised to a positive level, and a positive pulse is applied through capacitor C17 to, and triggers-ON, SCR7, so removing the back bias on diode D16. The scanning magnet subsequently actuates switch S85 for the fourth time since the push button PB1 was operated, and this triggers -ON SCR8. Through capacitor C20, this turns off SCR7, so reapplying the back bias on diode D16, and blocking the carrier signal from reaching the speaker 25. This terminates the transmission of the unmodulated carrier signal. In this manner, following closure or reed SW99, SW85 triggering On SCR7 and a second actuation of SW85 triggering ON SCR8, an unmodulated signal is transmitted. This provides for an unmodulated signal, 1-2/5 scans in duration, to follow binary information informing computer BCDs are finished ECG signal or calibration signal to follow.

During this first transmission, a calibration or standarization signal is transmitted, as indicated in FIG. 11. Thus when SCR8 is triggered-ON as mentioned above, its emitter goes positive and this voltage is applied through diode D19, lead Z17 reed switch S108 (FIG. 9E) if it is closed, lead Z18, contact 1 (FIG. 9B) switch blade SW2B and resistor R47 to the base of transistor Q1. Each time switch S108 is closed by the scan magnet 69, transistor Q1 is turned on, so energizing relay RY-1. It will be appreciated that the ECG recorder 1 shown in FIG. 1 also includes a selection or derivation switch which is set by the operator to determine which of the possible inputs from the patient will be recorded on the recorder. That switch also includes a standardization position, and when in that position a d.c. calibration voltage is made available inside the recorder. When the recorder is used with the data transmitter of the present invention, this standardization voltage is applied through lead 11 (see FIG. 1) to the socket S1 (see FIG. 9E).

When relay RY-1 is turned on as described above, relay RY-2 is also turned on by the positive voltage at the emitter of SCR8, this being applied through diode 19 and resistor R46 to the base of transistor Q2, which turns on to energize the relay RY-2. As will be clear from FIG. 9B, when relay RY-2 is energized it removes the ground from lead Z24 and so removes the effectiveness of capacitors C25 and C26 (see FIG. 9F) as regards the signal on lead Z42 from the input socket S1. These two capacitors by-pass to ground via resistor R48 all ECG signals available at the socket S1. This is necessary because the ECG recorder 1 has ECG signals on the relevant lead inside the recorder at all positions of the recorder derivation switch except its "standardization" position. In the data transmitter, these ever-present ECG signals are grounded whenever relay RY-2 is not energized, so that they can be eliminated when it is desired to transmit binary coded decimal information. The resistor R48 ensures that the grounding of lead Z42 does not involve short-circuiting the voltage developed inside the ECG recorder, and so protects the ECG recorder against damage.

The voltage on lead Z42 is a d.c. calibration voltage, and is chopped by ON and OFF cycling of the relay RY-1. This actuation of relay RY-1 is provided by the action of reed switch S108 (see FIG. 8) as it is operated by the magnets 71 and 73. Initially, reed switch S108 is OFF, since that it is the condition in which it is was previously left. As magnet 71 passes the switch S108, its force sets the switch to ON. After a lag of 36°, magnet 71 turns switch S108 OFF. After a further lag of 144°, magnet 73 turns switch S108 on, and after a lag of 36°, turns the switch off again. Each time reed switch S108 closes, SCR8 is triggered -ON and relay RY-1 is energized, and each time reed switch S85 is closed SCR9 is triggered -ON through diode D17 (turning off SCR8 through capacitor C22). However, since the positive voltage originally derived from the emitter of SCR8 is now replaced with a similar positive voltage derived from the emitter of SCR9, the relay RY-1 remains energized. The object of using two SCRs in this manner is to provide a time duration for the read out of calibration signals, equal to twice the time for the scan magnet 69 to make one revolution with the disc 63.

At the completion of two revolutions of scan magnet 69, following the triggering-ON of SCR9, reed switch S85 is again closed, triggering SCR10. When SCR10 is triggered, SCR9 is turned off through capacitor C24. Also, the positive signal at the emitter of triggered SCR10 is coupled through lead Z42, resistor R89 and capacitor 32 to trigger-ON SCR11. This clamps the emitter of transistor Q4, terminating further transmission of signals via speaker 25 until the push button PB1 is again actuated.

As mentioned earlier, the two transistors Q3 and Q4 and the four layer diode D21 form a frequency modulated 2 Kcps oscillator. In operation, in the absence of any frequency modulating signals, the transistor Q3 provides a predetermined current, which can be preset by resistor R54, that in conjunction with capacitor C27 establishes the normal or centre frequency of the oscillator. The current provided by transistor Q3 charges the capacitor C27 to the breakdown or firing voltage of diode D21. When diode 21 fires, the charge in capacitor C27 is depleted resulting in the turn off of diode D21. Following the turn off of diode D21, a charge is again built up in capacitor C27 until D21 again fires. The sawtooth voltage waveform thus generated across D21 is coupled to a power amplifier through resistor R55. The output of this amplifier is coupled through capacitor C28 to output transformer, which energizes the speaker 25.

Frequency modulation of this oscillator is provided by varying the rate at which capacitor C27 is charged, and thus the time taken for the voltage across the capacitor to reach the breakdown or firing voltage of the diode 21. Any signal coupled to the ECG socket S1, when capacitor C25 and capacitor C26 are rendered ineffective by energization of relay RY-2, causes frequency modulation by varying the charging rate of capacitor C27 by controlling the current passed by transistor Q3. The amount the oscillator frequency is deviated by any given signal is controlled by presetting of resistor R50.

Even the binary information is transmitted as a frequency modulated signal. Thus the binary signal on lead Z36 and on lead Z38 (FIG. 9F) is applied to the base of transistor Q6 and to the base of transistor Q5, and is clamped by diodes D129 and D130. Variable resistors R62 and R85 enable the extent of the frequency excursions produced by given positive and negative binary signals to be regulated as desired.

As shown in FIG. 9F, the whole data transmitter is powered by a standard North American 117 volts 60 cps power supply and includes an integral d.c. 28 volts power supply for operating the transmitter. The Zener diode D131 establishes the negative pole of the d.c. supply at 3.3 volts below ground potential, and the resistor R87 thus establishes the positive pole of the d.c. supply at 24.7 volts above ground potential. Capacitors C33 and C34 are provided to reduce transients in the power line, which otherwise could cause changes in the center frequency of the 2 Kcps oscillator during transmissions periods of BCD and calibration signals.

The above discussion has related to the first of the 13 transmissions which normally will be used to obtain a ECG analysis from the computer, and it is believed that the above description will in itself make the working of the equipment be clear to one skilled in the art. The following description of the remaining twelve transmissions is therefore considerably abbreviated compared with the foregoing description.

The second transmission is initiated by the operator setting the knob SW2K (see FIG. 2) of the transmitter to setting 2, setting the controls of the ECG recorder to select the first of its channels, and then pushing the start push button PB1 of the transmitter. As during the first transmission, an unmodulated carrier will be transmitted initially for a short period, and then 13 sets, each of four binary digits, will be transmitted, representing the decimal numbers selected by knobs 47L through 47U, then knob 47K, then the first and second digits of the setting of the switch SW2. The way in which these are generated and transmitted is obvious from the above description of the transmission of 13 binary coded decimal digits in transmission number 1, the selection of the different combination of digits to be transmitted arising from the change in the position of switch blade SW2C in FIG. 9C from position 1 to position 2 (which changes the five digits of group A to the five digits of group A′, leaves the digit of group C unchanges, and changes the five digits of group B to the five digits of group B′) and the change in the position of switch blade SW2D in FIG. 9D from position 1 to position 2, so that the two decimal numbers denoting the number of the ECG transmission change from 00 to 01.

When the transmission of these binary coded decimal digits as a frequency modulated signal has been completed, for a brief period an unmodulated carrier will be transmitted. This terminates, as in the first transmission, when the scanning magnet 69 operates switch S85 for the fourth time since the push button PB1 was operated, and this triggers-ON SCR8. Through capacitor C20, this turns off SCR7, so reapplying the back bias on diode D16, and terminating the transmission of unmodulated carrier.

When SCR8 is triggered-ON as mentioned above, its emitter goes positive and this voltage is applied through diode D19, lead Z17, reed switch S108 (FIG. 9E) if it is closed, lead Z18, and contact 1 of switch blade SW2B. However, this contact is no longer engaged by the switch blade SW2B, so that relay RY-1 is not energized. On the other hand, as before the positive voltage on the emitter of SCR8 is applied through diode D19 and resistor R46 to the base of transistor Q2, which conducts and energizes relay RY-2 to remove the ground from the capacitors C25 and C26. This enables the signal from the ECG recorder on socket S1 to be applied through lead Z42 to the base of the transistor Q3. This added signal on the base changes the rate of charge of the capacitor C27 as explained in connection with the transmission of the calibration pulses, and thus the frequency of the output from the oscillator is frequency modulated in accordance with the amplitude modulation of the signal received through socket S1. This frequency modulated carrier signal is applied through transformer T1 to the speaker 25.

This transmission of the ECG signal takes place whenever SCR8 or SCR9 is ON, and is terminated at the completion of two revolutions of the scan magnet 69, following the triggering-ON of SCR9, when reed switch S85 is again closed, triggering SCR10. When SCR10 is triggered, SCR9 is turned off through capacitor C24. Also, the positive signal at the emitter of triggered SCR10 is coupled through lead Z43, resistor R89 and capacitor 32 to trigger-ON SCR11. This clamps the emitter of transistor Q4, terminating further transmission of signals via speaker 25 until the push button PB1 is again actuated.

During each of the third through thirteenth transmissions, as will be clear from FIG. 11, it is required to transmit only the single set of four binary numbers indicating the decimal number of group C, i.e. the last decimal number in the file number of the patient, and two binary coded decimal numbers of the patient, and two binary coded decimal numbers indicating the number of the ECG transmission (i.e. a number one less than the number of the setting of switch SW2), and the actual ECG signal.

During each of these transmissions, the setting of switch blade SW2C (see FIG. 9C) eliminates from the circuit the reed switches of groups A, B, A′ and B′. Group C is still powered from the emitter of SCR4 through diode D12 and lead Z14, and the switch blade SW2D is still powered from lead Z14 through lead Z26. Thus these binary coded decimal numbers will be read out as the scan magnet 69 rotates past reed switches S87 through S90 and past reed switches S91 through S98. Switches S91, S92 and S3 being 000 for all cases. Each transmission will be terminated when reed switch S85 is again closed, triggering SCR10, leading to the clamping of transistor Q4.

It will be seen that the analogue signal supplied to the computer enables that computer to perform an analysis of the ECG being obtained from the patient, and this analysis is performed very quickly. Once all the relevant information has been transmitted over line 13, the telephone handpiece 23 can be removed from the transmitter 9 and replaced on an acoustic coupler of a computer terminal so that the computer 17 can, through the line 13 and the telephone handpiece, and through the print-out device of that computer terminal, print out its diagnosis of the ECG.

It is not essential that a computer terminal be available at the station where the data transmitter 9 is provided, since an ordinary telephone can be used to feed the information to the computer centre, and the diagnosis by the computer can be read out over that transmission line by a human operator. As regards the code bars 37A through 37U, these can be fabricated from bars of plexiglass and magnetic discs mounted in holes drilled in the plexiglass. In production, to reduce the cost of construction, these plexiglass bars may be replaced by bars, similar in length and width, of magnetized rubber, backed with strips of aluminum for rigidity. These strips of magnetizable rubber can be magnetized in a special jig comprising a trough of U transverse cross section forming a magnetic core and provided with magnetic pole pieces extending inwardly in pairs from the limbs of the U at locations suited to the pattern of magnets it is desired to produce in a rubber strip. The rubber strip is inserted in place in the trough extending lengthwise of the trough between the pairs of pole pieces, and an energising coil wound round the base of the U is energised to magnetize the magnetic core strongly. The rubber strip is thus formed with localised magnetized regions.

The embodiments of the invention in which an exclusive property or privilege is claimed are defined as follows:

1. Transmission means adapted for the transmission of medical data over a telephone transmission link to a remote center for diagnosis, comprising: a signal generator; first modulating means for modulating the output of said signal generator to transmit binary alphanumeric information over the transmission link; second modulating means for modulating the output of said signal generator to transmit non-alphanumeric information as an analogue signal over the transmission link; means for alternating coupling said first and second modulation means to said signal generator; coupling means coupling the modulated signal generator outputs to said telephone transmission link; a plurality of setting means for separately preselecting a plurality of alphanumeric symbols; coding means coupled with said setting means for coding each preselected alphanumeric symbol into a binary code unique to said each symbol, said coding means comprising a plurality of elongated members having magnets distributed thereon and a plurality of reed switches, said elongated members being longitudinally movable by said setting means to move said magnets into and out of magnetic coupling with said reed switches; and scanning means for scanning the binary coded symbols in a predetermined sequence and providing an intermediate fluctuating output to indicate said selected symbols in a binary manner and in a predetermined sequence, the output of said scanning means being coupled to said first modulating means to provide said modulation of the signal generator output as a function of said intermediate fluctuating output.

2. Transmission means as claimed in claim 1, wherein the coding means members are moved by control knobs and are coupled with a lost-motion mechanism which is arranged to ensure that, during resetting, a magnet is moved through a sufficient distance to release a reed switch which, at a previous setting of the associated coding means member, had been set by that magnet.

3. Transmission means as claimed in claim 2, wherein the lost motion mechanism includes a plate bearing indicia indicating the setting of the setting means, the lost motion exists between this plate and the coding means member, and frictional means are provided to ensure that said plate can move only when moved positively by a setting knob of said setting means.

* * * * *